US012722967B2

(12) United States Patent
Daley et al.

(10) Patent No.: US 12,722,967 B2
(45) Date of Patent: Sep. 1, 2026

(54) SYSTEM AND METHOD FOR REFUELING HYDROGEN VEHICLES

(71) Applicant: FCA US LLC, Auburn Hills, MI (US)

(72) Inventors: James J Daley, Auburn Hills, MI (US); Jeremy Brown, Auburn Hills, MI (US); Nathaniel Villella, Auburn Hills, MI (US); Christopher O'Dea, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 112 days.

(21) Appl. No.: 18/785,652

(22) Filed: Jul. 26, 2024

(65) Prior Publication Data

US 2026/0028217 A1 Jan. 29, 2026

(51) Int. Cl.
*B67D 7/14* (2010.01)
*B67D 7/04* (2010.01)
*B67D 7/78* (2010.01)

(52) U.S. Cl.
CPC ................ *B67D 7/14* (2013.01); *B67D 7/04* (2013.01); *B67D 7/78* (2013.01)

(58) Field of Classification Search
CPC ... B67D 7/04; B67D 7/14; B67D 7/32; B67D 7/80
See application file for complete search history.

(56) References Cited

U.S. PATENT DOCUMENTS

| | | | | |
|---|---|---|---|---|
| 10,132,447 | B2 * | 11/2018 | Whiteman | F17C 5/06 |
| 11,499,765 | B2 * | 11/2022 | Werlen | F25B 9/008 |
| 2006/0086406 | A1 * | 4/2006 | Sato | G06Q 30/08 141/94 |
| 2008/0234888 | A1 * | 9/2008 | Zanardelli | H04L 43/0817 701/34.2 |
| 2011/0093305 | A1 * | 4/2011 | Alexander | G06Q 10/06 705/7.13 |
| 2019/0330047 | A1 * | 10/2019 | Joginipelly | B67D 7/3272 |

FOREIGN PATENT DOCUMENTS

| | | | | |
|---|---|---|---|---|
| EP | 4019824 | B1 * | 11/2023 | F17C 7/00 |

* cited by examiner

*Primary Examiner* — Timothy L Maust
(74) *Attorney, Agent, or Firm* — Jeremy J. Klobucar

(57) ABSTRACT

A system and method for refueling a fleet of hydrogen fueled vehicles is provided. The system includes a bulk hydrogen storage tank, a pump/chiller assembly, a plurality of high pressure hydrogen dispenser and a controller. The pump/chiller assembly includes a compressor configured to pump hydrogen fuel and a chiller configured to chill the hydrogen fuel. The plurality of high pressure hydrogen dispensers are configured to selectively couple to a corresponding plurality of hydrogen fueled vehicles of a fleet of vehicles. The controller: receives fleet parameters indicative of operating conditions of the fleet of vehicles; receives refueler data indicative of operating conditions of the system; determines, based on the fleet parameters and the refueler data, optimal operating parameters used to achieve efficient refueling of the fleet of vehicles; and implements the optimal operating parameters into the system.

17 Claims, 4 Drawing Sheets

SYSTEM AND METHOD FOR REFUELING HYDROGEN VEHICLES

FIELD

The present application generally relates to vehicles that use hydrogen as fuel and, more particularly, to a system and method for refueling a fleet of hydrogen fueled vehicles.

BACKGROUND

Conventional gasoline and diesel engines can provide acceptable power output for most vehicles but may have undesirable carbon emissions. Alternative propulsion systems that have less carbon emissions are becoming more popular. For example, an electrified vehicle (hybrid electric, plug-in hybrid electric, range-extended electric, battery electric, etc.) includes at least one battery system and at least one electric motor. Hydrogen fuel cell electric vehicles (FCEV) can also provide an associated powertrain with suitable propulsion for most applications.

Generally speaking, alternative propulsion systems that replace gasoline and diesel engines, while offering reduced carbon emissions can suffer from other challenges. For example, some alternative fuel vehicles are fueled by hydrogen. Typically, the hydrogen is stored in on-board hydrogen tanks. Hydrogen can be replenished by refilling the hydrogen tanks at a hydrogen refueling station. In most instances however, hydrogen refueling stations are not yet widespread and are generally less available compared to conventional gasoline and diesel refueling stations. Furthermore, in some implementations is it desirable to refuel a fleet of hydrogen fueled vehicles with hydrogen. It is particularly challenging to refuel a small fleet of vehicles, such as ten or fewer, in a cost effective manner. For example, refueling costs for refueling hydrogen are very high due to the rate of hydrogen filling and the high rate of cooling. Accordingly, while such vehicle propulsion systems powered by fuel cells work well for their intended purpose, there exists an opportunity for improvement in the relevant art.

SUMMARY

According to one example aspect of the invention, a system for refueling a fleet of hydrogen fueled vehicles is provided. The system includes a bulk hydrogen storage tank, a pump/chiller assembly, a plurality of high pressure hydrogen dispenser and a controller. The pump/chiller assembly includes a compressor configured to pump hydrogen fuel and a chiller configured to chill the hydrogen fuel. The plurality of high pressure hydrogen dispensers are configured to selectively couple to a corresponding plurality of hydrogen fueled vehicles of a fleet of vehicles. The controller: receives fleet parameters indicative of operating conditions of the fleet of vehicles; receives refueler data indicative of operating conditions of the system; determines, based on the fleet parameters and the refueler data, optimal operating parameters used to achieve efficient refueling of the fleet of vehicles; and implements the optimal operating parameters into the system.

In some implementations, at least some vehicles of the fleet of hydrogen fueled vehicles are refueled concurrently.

In some implementations, at least some vehicles of the fleet comprises between five and ten vehicles.

According to another example aspect of the invention, the system further comprises a fast fill storage container that receives hydrogen fuel from the bulk hydrogen storage tank and is configured to provide high pressure hydrogen fuel to one vehicle of the fleet of vehicles during a fast fill event.

In some implementations, the fleet parameters include at least one of a current ambient temperature, a current hydrogen level of the fast fill hydrogen tank and a quantity of vehicles of the fleet of vehicles connected to the plurality of high pressure hydrogen dispensers.

In some implementations, the fleet parameters include at least one of a vehicle hydrogen level of a vehicle of the fleet, a temperature of a hydrogen tank of a vehicle of the fleet, and an average hydrogen use for a vehicle of the fleet of vehicles.

According to another example aspect of the invention, the refueler data comprises at least one of a fill level of the bulk hydrogen storage tank, a last liquid hydrogen off take, an efficiency of the compressor, a maintenance schedule, an efficiency of the chiller, a replenishment rate of the hydrogen fuel, and an energy usage rate.

In other implementations, the optimal operating parameters comprises at least one of a vehicle fill level, a vehicle and fast fill priority, an operation time and a hydrogen fuel flow rate.

According to another example aspect of the invention, a method for operating a system that refuels a fleet of hydrogen fueled vehicles is provided. The system has: a bulk hydrogen storage tank that stores hydrogen fuel; a pump/chiller assembly having a compressor configured to pump hydrogen fuel and a chiller configured to chill the hydrogen fuel; and a plurality of high pressure hydrogen dispensers configured to selectively couple to a corresponding plurality of hydrogen fueled vehicles of a fleet of vehicles. The method comprises: receiving, at a controller, fleet parameters indicative of operating conditions of the fleet of vehicles; receiving, at the controller, refueler data indicative of operating conditions of the system; determining, at the controller and based on the fleet parameters and the refueler data, optimal operating parameters used to achieve efficient refueling of the fleet of vehicles; and implementing the optimal operating parameters into the system.

In some implementations, the method includes refueling at least some of the vehicles of the fleet of hydrogen fueled vehicles concurrently.

In some implementations, refueling comprises refueling between five and ten vehicles of the fleet of hydrogen fueled vehicles concurrently.

In examples, refueling comprises refueling at 700 bar.

In additional features, the fleet parameters include at least one of a current ambient temperature, a current hydrogen level of the fast fill hydrogen tank and a quantity of vehicles of the fleet of vehicles connected to the plurality of high pressure hydrogen dispensers.

In examples, the fleet parameters include at least one of a vehicle hydrogen level of a vehicle of the fleet, a temperature of a hydrogen tank of a vehicle of the fleet, and an average hydrogen use for a vehicle of the fleet of vehicles.

In implementations, the refueler data comprises at least one of a fill level of the bulk hydrogen storage tank, a last liquid hydrogen off take, an efficiency of the compressor, a maintenance schedule, an efficiency of the chiller, a replenishment rate of the hydrogen fuel, and an energy usage rate.

In other examples, the optimal operating parameters comprises at least one of a vehicle fill level, a vehicle and fast fill priority, an operation time and a hydrogen fuel flow rate.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, some alternative fuel vehicles are fueled by hydrogen. Typically, the hydrogen is stored in on-board hydrogen tanks. Hydrogen can be replenished by refilling the hydrogen tanks at a hydrogen refueling station. In most instances however, hydrogen refueling stations are not yet widespread and are generally less available compared to conventional gasoline and diesel refueling stations. Furthermore, in some implementations is it desirable to refuel a fleet of hydrogen fueled vehicles with hydrogen. It is particularly challenging to refuel a small fleet of vehicles, such as ten or fewer, in a cost effective manner. For example, refueling costs for refueling hydrogen are very high due to the rate of hydrogen filling and the high rate of cooling. Prior art solutions typically provide half tank refueling (such as at pressures of 350 Bar), or with a more desirable 700 bar, but large enough to support a fleet of hydrogen fueled vehicles, such as over forty vehicles and at a high cost (such as, for example, many million US dollars). Furthermore, currently available 700 bar hydrogen refueling solutions target filling one vehicle at a rate of around 30 minutes at the slowest. Most solutions target 10 minutes. These prior art solutions require each vehicle to be sequentially pulled up and connected to the hydrogen pump separately.

The present disclosure provides a system and method for refueling a fleet of hydrogen fueled vehicles. The principles herein are particularly advantageous for refueling a small fleet of vehicles such as, but not limited to ten or fewer vehicles. Other quantities of vehicles, such as twenty or less, for example can also be refueled using the system and method for refueling disclosed herein. As will become appreciated from the following discussion, the refueling system herein will allow for smaller filling, lower cost components to get vehicles filled at pressures such as, but not limited to, 700 bar. The refueling system disclosed herein requires lower electrical consumption and lower carbon dioxide ($CO_2$) consumption from the electricity used to power the station. In examples, multiple vehicles can be refueled simultaneously without the need to transfer hydrogen connection between vehicles.

Figure 1:
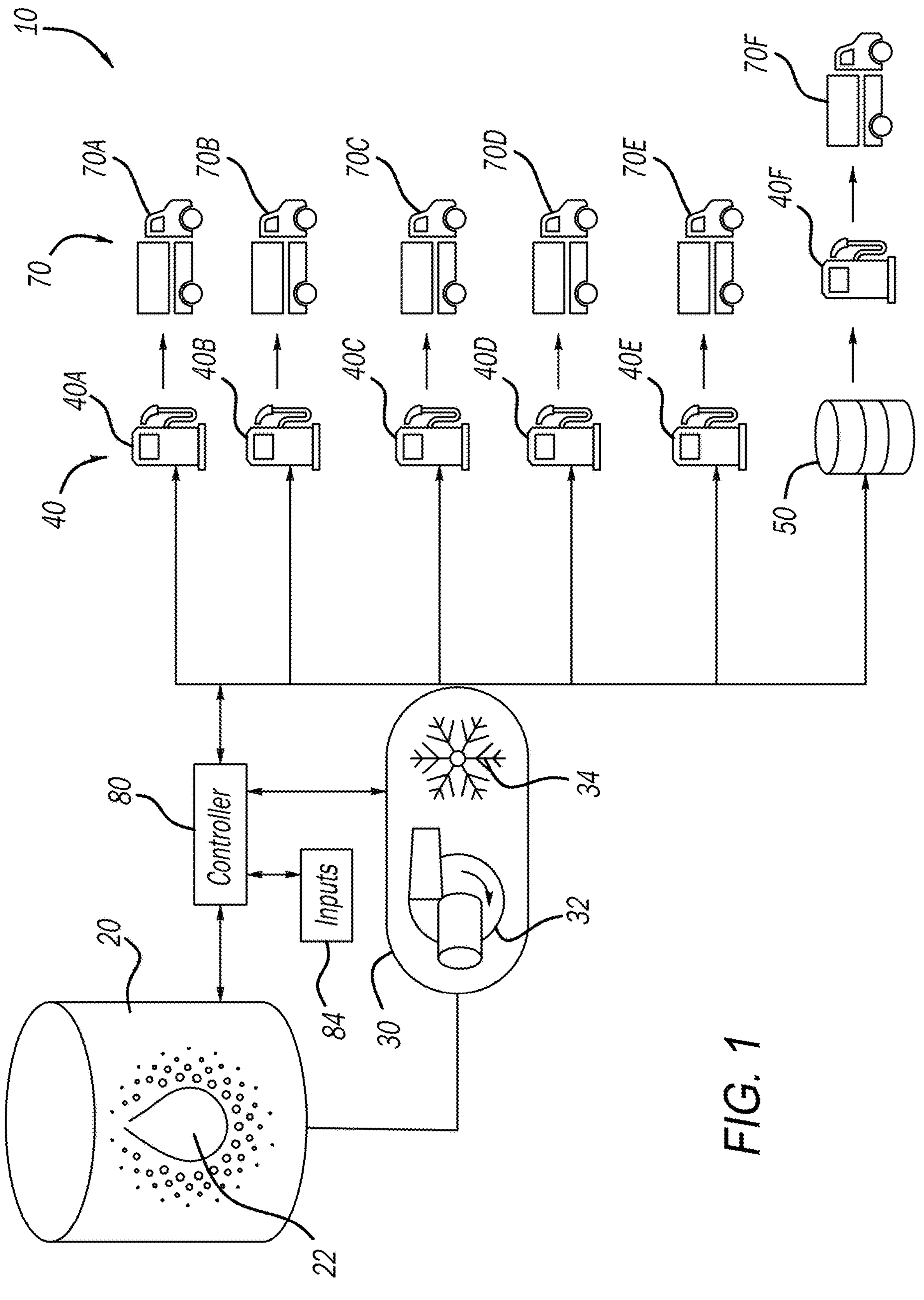
FIG. 1 is a functional block diagram of a hydrogen refueling system for refueling a fleet of hydrogen fueled vehicles according to the principles of the present application.

With initial reference to FIG. 1, a system for refueling a fleet of hydrogen fueled vehicles is shown and generally identified at reference numeral 10. The system 10 includes a bulk hydrogen storage tank 20, a pump/chiller assembly 30, a plurality of high pressure hydrogen dispensers collectively identified at reference 40 and individually identified at reference 40A-40F, and a high pressure storage container 50. The system for refueling a fleet of hydrogen fueled vehicles 10 is configured to refuel hydrogen into a fleet of vehicles, collectively identified at 70 and individually identified at reference numeral 70A-70F. The fleet 70 can be any number of vehicles such as between five and ten. Other quantities can be used with the system 10 disclosed herein. The high pressure storage container 50 is sized to fast fill a small portion of the fleet such as during the normal shift (e.g., "on-peak" hours). As discussed herein, the system for refueling a fleet of hydrogen fueled vehicles 10 includes a controller 80 receives inputs 84 and communicates with the bulk hydrogen storage tank 20, the pump/chiller assembly 30, the plurality of high pressure hydrogen dispensers 40 and the high pressure storage tank 50 to coordinate refueling of the desired vehicles in the fleet 40. The bulk hydrogen storage tank 20 stores hydrogen 22. The pump/chiller assembly 30 generally includes a pump 32 and chiller 34.

Figure 2A:
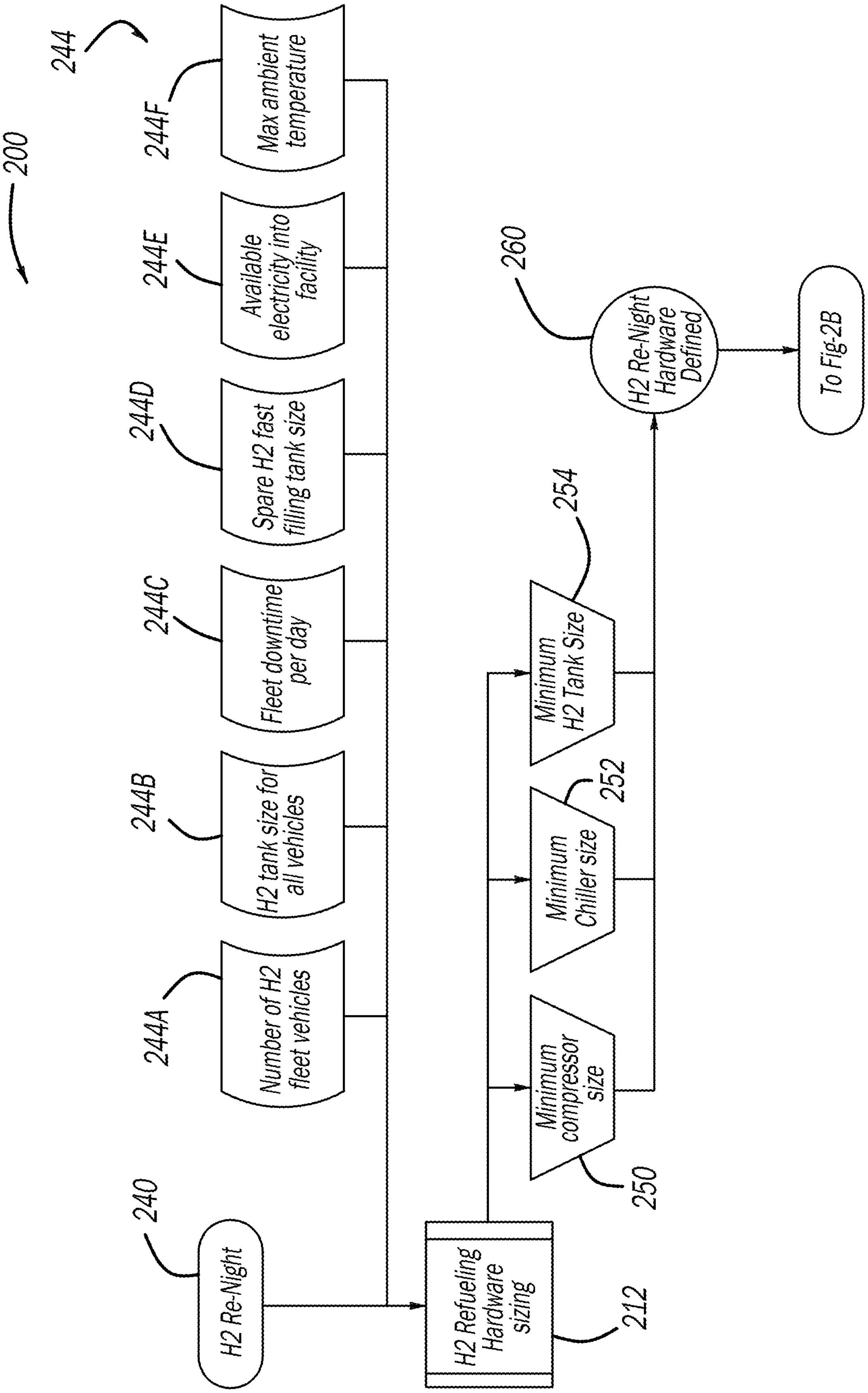
FIGS. 2A-2C are an exemplary control logic flow for operating the hydrogen refueling system of FIG. 1 according to the principles of the present application.
Figure 2B:
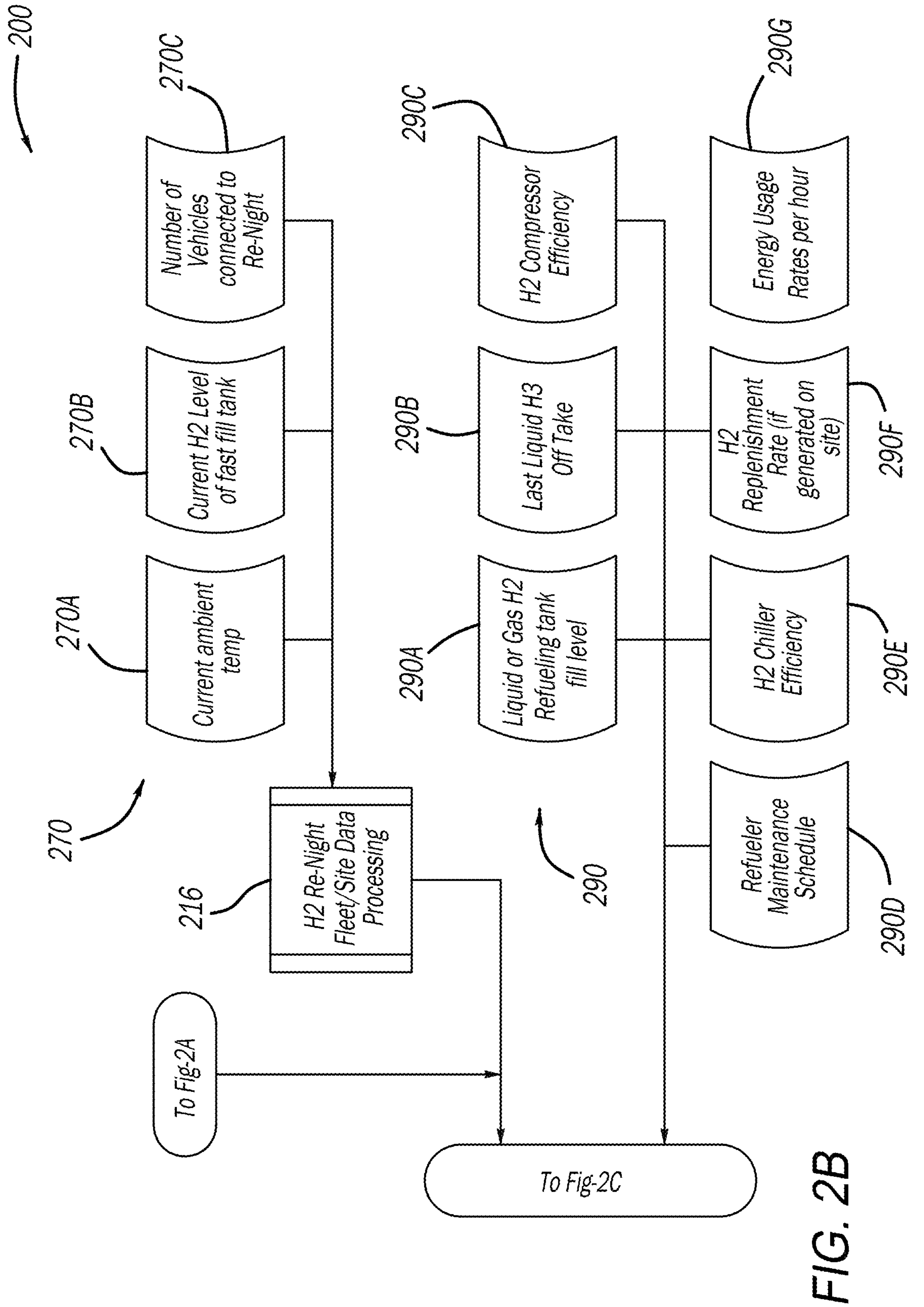
Figure 2C:
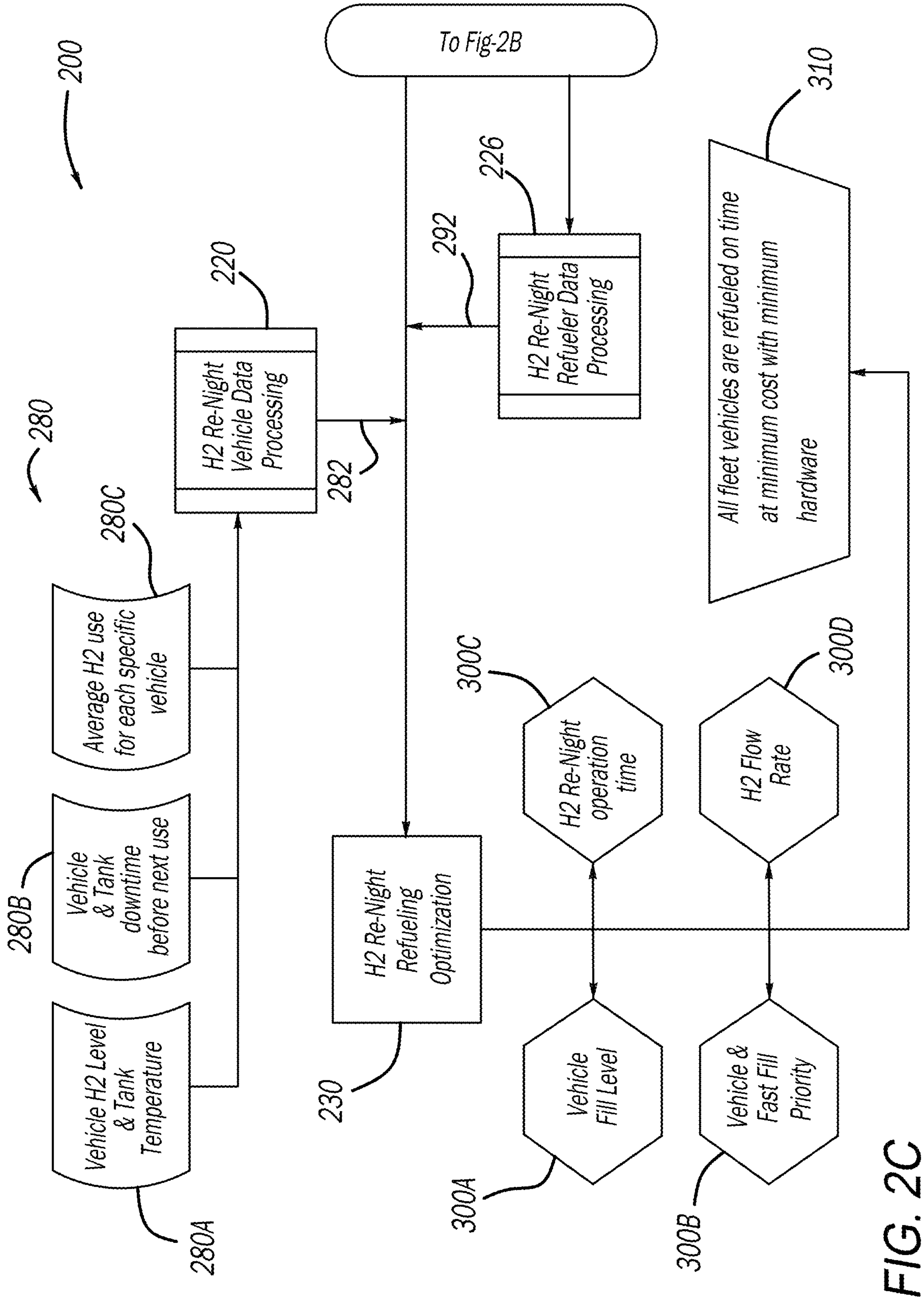

With additional reference to FIGS. 2A-2C, an exemplary control strategy 200 for controlling operation of the system for refueling a fleet of hydrogen fueled vehicles 10 will be described. In general, the control strategy 200, executed by the controller 80 includes a hydrogen refueling hardware sizing module 210, a hydrogen fleet/site data processing module 216, a vehicle data processing module 220, a refueler data processing module 226, and a hydrogen refueling optimization module 230. In one advantage of the system for refueling a fleet of hydrogen fueled vehicles 10 disclosed herein, the fleet 70 can be connected to the high pressure dispensers 40 during "off-peak" hours (e.g., such as at night or other reduced activity timeframe) and refueled when unneeded. In examples, the fleet 70 can be connected to the high pressure dispenser 40 at the end of a working shift. The system 10 can be configured to refuel the fleet 70, such as overnight, such that all of the vehicles in the fleet 70 can be sufficiently refueled prior to needing for operation again. As used herein, the hydrogen refueling at night is referred to using the phrase "H2 Re-Night".

The control strategy begins at 240 where the H2 Re-Night control is initiated. A series of hydrogen refueling hardware sizing parameters 244 are input into the hydrogen refueling hardware sizing module 210. In the example shown, the hydrogen refueling hardware sizing parameters 244 include a number of hydrogen fleet vehicles 244A, a hydrogen tank size for all vehicles 244B, a fleet downtime per day 244C, a spare hydrogen filling tank size 244D, an available electricity into the facility 244E and a maximum ambient temperature 244F. Based on the series of hydrogen refueling hardware sizing parameters 244, the hydrogen refueling hardware sizing module 210 determines a minimum compressor size 250, a minimum chiller size 252 and a minimum hydrogen tank size 254 that are all determined at the hardware defined step 260. It will be appreciated that the steps described upstream of the hardware defined step 260 can be carried out to assist in building the system for refueling a fleet of hydrogen fueled vehicles 10 and prior to using the fuel to refuel the fleet 70.

The hydrogen fleet/site data processing module 216 receives a series of fleet parameters 270 and outputs a fleet input 272 based on the series of fleet parameters 270. In the example shown, the fleet parameters 270 include a current ambient temperature 270A, a current hydrogen level 270B of the fast fill tank 50, and a number of vehicles 270C connected to the system 10. The vehicle data processing module 220 receives a series of vehicle parameters 280 and outputs a vehicle data input 282 based on the series of vehicle parameters 280. In the example shown, the vehicle parameters 280 include a vehicle hydrogen level and tank temperature 280A, a vehicle downtime before next use 280B and an average hydrogen use for each specific vehicle 280C.

The refueler data processing module 226 receives a series of refueler data 290 and outputs a refueler input 292 based on the series of refueler data 290. In the example provided, the refueler data 290 includes a liquid or gas hydrogen refueling tank fill level 290A, a last liquid hydrogen off take 290B, a hydrogen compressor efficiency 290C, a refueler maintenance schedule 290D, a hydrogen chiller efficiency 290E, a hydrogen replenishment rate (if generated on site) 290F and an energy usage rates per hour 290G. Some or all of the fleet parameters 270, the vehicle parameters 280 and the refueler data 290 are represented in FIG. 1 as the inputs 84 that are received by the controller 80. In additional examples, the series of hydrogen refueling hardware sizing parameters 244 can also be represented as the inputs 84.

The fleet input 272, the vehicle data input 282 and the refueler input 292 are received by the refueling optimization module 230. Based on the fleet input 272, the vehicle data input 282 and the refueler input 292, the refueling optimization module 230 determines optimal operating parameters 300 including a vehicle fill level 300A, a vehicle and fast fill priority 300B, an operation time 300C and a hydrogen flow rate 300D. The optimal operating parameters 300 are used to achieve refueling of all fleet vehicles 70 on time at a minimum cost with minimum hardware 310. It will further be appreciated that vehicles can be added or removed from the system 10 as needed. They do not all need to be connected and filled (or decoupled) at the same time. If any vehicle reaches a full status, it can be taken off of the respective refueler 40 and used while the others remain connected.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A system for refueling a fleet of hydrogen fueled vehicles, the system comprising:

a bulk hydrogen storage tank that stores hydrogen fuel;

a pump/chiller assembly having a compressor configured to pump hydrogen fuel and a chiller configured to chill the hydrogen fuel;

a plurality of high pressure hydrogen dispensers configured to selectively couple to a corresponding plurality of hydrogen fueled vehicles of a fleet of vehicles simultaneously connected to the system at a single co-located facility; and a controller that is configured to:

receive fleet parameters indicative of operating conditions of the fleet of vehicles;

receive refueler data indicative of operating conditions of the system, the refueler data comprising operating condition data from the pump/chiller assembly and the plurality of high pressure hydrogen dispensers;

determine, based on the fleet parameters and the refueler data, optimal operating parameters used to achieve efficient refueling of the fleet of vehicles; and implement the optimal operating parameters into the pump/chiller assembly and the plurality of high pressure hydrogen dispensers.

2. The system of claim 1, wherein at least some vehicles of the fleet of hydrogen fueled vehicles are refueled concurrently.

3. The system of claim 2, wherein the at least some vehicles of the fleet comprises between five and ten vehicles.

4. The system of claim 3, wherein the fleet of vehicles are refueled at 700 bar.

5. The system of claim 1, further comprising a fast fill storage container that receives hydrogen fuel from the bulk hydrogen storage tank and is configured to provide high pressure hydrogen fuel to one vehicle of the fleet of vehicles during a fast fill event.

6. The system of claim 5, wherein the fleet parameters include at least one of a current ambient temperature, a current hydrogen level of the fast fill hydrogen tank and a quantity of vehicles of the fleet of vehicles connected to the plurality of high pressure hydrogen dispensers.

7. The system of claim 1, wherein the fleet parameters include at least one of a vehicle hydrogen level of a vehicle of the fleet, a temperature of a hydrogen tank of a vehicle of the fleet, and an average hydrogen use for a vehicle of the fleet of vehicles.

8. The system of claim 1, wherein the refueler data comprises at least one of a fill level of the bulk hydrogen storage tank, a last liquid hydrogen off take, an efficiency of the compressor, a maintenance schedule, an efficiency of the chiller, a replenishment rate of the hydrogen fuel, and an energy usage rate.

9. The system of claim 1, wherein the optimal operating parameters comprises at least one of a vehicle fill level, a vehicle and fast fill priority, an operation time and a hydrogen fuel flow rate.

10. A method for operating a system that refuels a fleet of hydrogen fueled vehicles, the system having: a bulk hydrogen storage tank that stores hydrogen fuel; a pump/chiller assembly having a compressor configured to pump hydrogen fuel and a chiller configured to chill the hydrogen fuel; and a plurality of high pressure hydrogen dispensers configured to selectively couple to a corresponding plurality of hydrogen fueled vehicles of a fleet of vehicles simultaneously connected to the system at a single co-located facility, the method comprising:

receiving, at a controller, fleet parameters indicative of operating conditions of the fleet of vehicles;

receiving, at the controller, refueler data indicative of operating conditions of the system, the refueler data comprising operating condition data from the pump/chiller assembly and the plurality of high pressure hydrogen dispensers;

determining, at the controller and based on the fleet parameters and the refueler data, optimal operating parameters used to achieve efficient refueling of the fleet of vehicles; and implementing the optimal operating parameters into the pump/chiller assembly and the plurality of high pressure hydrogen dispensers.

11. The method of claim 10, further comprising:

refueling at least some of the vehicles of the fleet of hydrogen fueled vehicles concurrently.

12. The method of claim 11, wherein refueling comprises refueling between five and ten vehicles of the fleet of hydrogen fueled vehicles concurrently.

13. The method of claim 12, wherein refueling comprises refueling at 700 bar.

14. The method of claim 10, wherein the fleet parameters include at least one of a current ambient temperature, a current hydrogen level of the fast fill hydrogen tank and a quantity of vehicles of the fleet of vehicles connected to the plurality of high pressure hydrogen dispensers.

15. The method of claim 10, wherein the fleet parameters include at least one of a vehicle hydrogen level of a vehicle of the fleet, a temperature of a hydrogen tank of a vehicle of the fleet, and an average hydrogen use for a vehicle of the fleet of vehicles.

16. The method of claim 10, wherein the refueler data comprises at least one of a fill level of the bulk hydrogen storage tank, a last liquid hydrogen off take, an efficiency of the compressor, a maintenance schedule, an efficiency of the chiller, a replenishment rate of the hydrogen fuel, and an energy usage rate.

17. The method of claim 10, wherein the optimal operating parameters comprises at least one of a vehicle fill level, a vehicle and fast fill priority, an operation time and a hydrogen fuel flow rate.

* * * * *